(12) United States Patent
Ni

(10) Patent No.: US 10,047,266 B1
(45) Date of Patent: Aug. 14, 2018

(54) ENERGY-SAVING AND ENVIRONMENT-FRIENDLY ANTI-FREEZING SOLUTION FOR WATER SYSTEM ENGINE

(71) Applicant: Yueyu Ni, Yangzhou (CN)

(72) Inventor: Yueyu Ni, Yangzhou (CN)

( * ) Notice: Subject to any disclaimer, the term of this patent is extended or adjusted under 35 U.S.C. 154(b) by 0 days.

(21) Appl. No.: 15/587,361

(22) Filed: May 4, 2017

(51) Int. Cl.
  *C09K 5/00* (2006.01)
  *C09K 5/20* (2006.01)

(52) U.S. Cl.
  CPC . *C09K 5/20* (2013.01); *C09K 5/00* (2013.01)

(58) Field of Classification Search
  CPC ... C09K 5/00; C09K 5/08; C09K 5/10; C09K 5/20
  USPC .......................................................... 252/73
  See application file for complete search history.

(56) References Cited

U.S. PATENT DOCUMENTS

| | | | | |
|---|---|---|---|---|
| 7,481,924 | B2 * | 1/2009 | Takahashi | C02F 1/481 204/155 |
| 9,265,725 | B2 * | 2/2016 | Tamarkin | A61K 8/362 |
| 2004/0069454 | A1 * | 4/2004 | Bonsignore | B82Y 30/00 165/104.15 |
| 2004/0206941 | A1 * | 10/2004 | Gurin | B82Y 30/00 252/500 |

FOREIGN PATENT DOCUMENTS

| | | | | |
|---|---|---|---|---|
| CN | 102732218 A | * | 10/2012 | C09K 3/18 |
| CN | 102746833 A | * | 10/2012 | C09K 5/20 |
| CN | 105309422 A | * | 2/2016 | A01N 25/04 |
| CN | 105542729 A | * | 5/2016 | C09K 5/20 |
| WO | WO 2009/122265 A1 | * | 10/2009 | C09K 3/18 |

OTHER PUBLICATIONS

English abstract CN 105542729 A, Ni Yeuyu, published May 4, 2016 (Year: 2016).*
English abstract CN 105309422 A, Li et al., published Feb. 10, 2016 (Year: 2016).*
English abstract CN 102746833 A, Ling et al., published Oct. 24, 2012 (Year: 2012).*
English abstract CN 102732218 A, Ling et al., published Oct. 17, 2012 (Year: 2012).*

* cited by examiner

*Primary Examiner* — Jane L Stanley
(74) *Attorney, Agent, or Firm* — Gokalp Bayramoglu

(57) ABSTRACT

The invention discloses an energy-saving and environment-friendly anti-freezing solution for a water system engine, which includes calcium chloride anti-freezing solution and alcohol-type anti-freezing solution. N-methyl pyrrolidone and allyl glycidyl ether are added into the calcium chloride anti-freezing solution and the alcohol-type anti-freezing solution. With the energy-saving and environment-friendly anti-freezing solution for the water system engine, when the water system engine gets into the best operating state, rapid cooling down and heat dissipation can be achieved. When the temperature is low, rapid heating-up can be achieved. Thus, the temperature of the engine is kept in constant and stable state, so that the engine can perform the combustion sufficiently to convert the thermal energy into power. The purposes of saving oil, improving power, reducing emission, saving energy, and protecting the environment are actually achieved.

4 Claims, No Drawings

ENERGY-SAVING AND ENVIRONMENT-FRIENDLY ANTI-FREEZING SOLUTION FOR WATER SYSTEM ENGINE

TECHNICAL FIELD

The present invention relates to the field of chemical reagent, particularly to an energy-saving and environment-friendly anti-freezing solution for a water system engine which has characteristics of rapid heating-up, rapid heat dissipation, and good insulation.

BACKGROUND

The optimum combustion temperature of the water system engine is the temperature when the thermostat is about to open but not yet open. Because the thermostat slowly opens based on the temperature increase. Higher the water temperature, more the thermostat opens. When the thermostat opens completely, a large cycle is formed. At this time, the electric fan starts to work, and the temperature difference increases. The water temperature gets unstable, causing incomplete combustion. As a result, the fuel consumption gets increased, the power gets reduced, and the exhaust-gas emissions exceed the standard. Therefore, the anti-freezing solution is needed to keep the engine temperature in a constant and stable state.

Traditional anti-freezing solution only has one role, i.e., anti-freezing. The temperature is unstable. After long-term use, water scale will appear, resulting in water path congestions.

SUMMARY

The purpose of the present invention is to provide an energy-saving and environment-friendly anti-freezing solution for the water system engine, which has characteristics of rapid heating-up, rapid heat dissipation, and good insulation.

The technical solutions used by the present invention are as follows.

In accordance with one aspect of the present invention, an energy-saving and environment-friendly anti-freezing solution for a water system engine is provided. The energy-saving and environment-friendly anti-freezing solution for a water system engine includes calcium chloride anti-freezing solution and alcohol-type anti-freezing solution. N-methyl pyrrolidone and allyl glycidyl ether are added into the calcium chloride anti-freezing solution and the alcohol-type anti-freezing solution.

In some embodiments, the calcium chloride anti-freezing is prepared to include the following components in mass parts:

calcium chloride 6%-8%
carboxymethyl cellulose 12%-14%
sodium benzoate 4%-7%
N-methyl pyrrolidinone 7%-9%
sucrose 34%-37%
allyl glycidyl ether 6%-8.5%
pigment 0.3%-0.5%
urea 7%-11%
triethanolamine 1%-5%
the rest is deionized water.

In some embodiments, the alcohol-type anti-freezing solution is prepared to include the following components in mass parts:

benzotriazole 13%-16%
2-amino-1-butanol 32%-34%
sodium benzoate 2%-5%
N-methyl pyrrolidinone 7%-9%
sucrose 24%-27%
allyl glycidyl ether 6%-8.5%
pigment 0.3%-0.5%
the rest is deionized water.

At the time when the thermostat just opens, the water system engine is in the best working state. The present invention provides an energy-saving and environment-friendly anti-freezing solution for a water system engine, which can rapidly cool down and dissipate the heat. When the temperature is low, rapid heating-up can be achieved. Thus, the temperature of the engine is kept in a constant and steady state, so that the engine can perform the combustion sufficiently to convert the thermal energy into power. The purposes of saving oil, improving power, reducing emission, saving energy, and protecting the environment are achieved. The present invention has a rapid heating-up rate, good insulation, and rapid heat dissipation. Meanwhile, water scale can be removed. The problems that the water system engine is unstable in temperature, the combustion is incomplete, the fuel consumption is excessive, the exhaust-gas emission is high, the water channel is prone to be congested, and heat dissipation is poor are overcome.

DETAILED DESCRIPTION

Hereinafter, the technical solutions of the present invention are further described in detail with reference to the embodiments.

In accordance with one aspect of the present invention, the present invention provides an energy-saving and environment-friendly anti-freezing solution for a water system engine, which is prepared to include the following components in mass parts:

Embodiment 1: calcium chloride 6%, carboxymethyl cellulose 12%, sodium benzoate 4%, N-methyl pyrrolidone 7%, sucrose 34%, allyl glycidyl ether 6%, pigment 0.3%, urea 7%, triethanolamine 1%, and the rest is deionized water.

Embodiment 2: calcium chloride 8%, carboxymethyl cellulose 14%, sodium benzoate 7%, N-methyl pyrrolidinone 9%, sucrose 37%, allyl glycidyl ether 8.5%, pigment 0.5%, urea 11%, triethanolamine 5%, and the rest is deionized water.

Embodiment 3: calcium chloride 7%, carboxymethyl cellulose 13%, sodium benzoate 5.5%, N-methyl pyrrolidone 8%, sucrose 35.5%, allyl glycidyl ether 7%, pigment 0.4%, urea 9%, triethanolamine 3%, and the rest is deionized water.

Wherein calcium chloride having the effect of anti-freezing and lowering freezing point. Carboxymethyl cellulose has a thickening effect. Sodium benzoate has the antibacterial and preservative effects. N-methyl pyrrolidone has the effects of improving boiling point, cleaning, and dispersing. Sucrose has the anti-freezing effect. Allyl glycidyl ether has the effects of coupling and scale inhibition. Urea has the effects of anti-freezing and metal protection. Triethanolamine has thickening, emulsification, and anti-oxidation effects.

According to another aspect of the present invention, the present invention provides an energy-saving and environment-friendly anti-freezing solution for a water system engine, which is prepared to include the following components in mass parts:

Embodiment 1: benzotriazole 13%, 2-amino-1-butanol 32%, sodium benzoate 2%, N-methyl pyrrolidone 7%, sucrose 24%, allyl glycidyl ether 6%, pigment 0.3%, and the rest is deionized water.

Embodiment 2: benzotriazole 16%, 2-amino-1-butanol 34%, sodium benzoate 5%, N-methyl pyrrolidone 9%, sucrose 27%, allyl glycidyl ether 8.5%, pigment 0.5%, and the rest is deionized water.

Embodiment 3: benzotriazole 14.5%, 2-amino-1-butanol 33%, sodium benzoate 3.5%, N-methyl pyrrolidone 8%, sucrose 25.5%, allyl glycidyl ether 7%, pigment 0.4%, and the rest is deionized water.

Benzotriazole has the effects of metal protection and corrosion protection. 2-amino-1-butanol 34% has the effects of thickening and emulsifying. Sodium benzoate has the preservative and antibacterial effects. N-methyl pyrrolidone has the effects of increasing the boiling point, cleaning, and dispersing. Sucrose has the anti-freezing effect. Allyl glycidyl ether has the effects of coupling and scale inhibition.

The present invention provides an energy-saving and environment-friendly anti-freezing solution for a water system engine, added with N-methyl pyrrolidone and allyl glycidyl ether. The boiling point is increased. Meantime, the anti-scaling effect is achieved. When the water system engine gets into the best operating state, rapid cooling down and heat dissipation can be achieved by the energy-saving and environment-friendly anti-freezing solution for the water system engine. The present invention has a smooth operation, low emission, fuel saving, easy start, rapid heating-up rate, rapid cooling-down rate, improved power, anti-freezing, anti-corrosion, anti-boil, and anti-scaling. The freezing point is lowered from −15° C. to −60° C. The boiling point is 120° C.

The above are only preferred embodiments of the present invention. It should be noted that, without departing from the inventive concept of the present invention, the skilled artisan can make similar variations and modifications, which should be considered to fall within the scope of the invention.

What is claimed is:

1. An energy-saving and environment-friendly anti-freezing solution for a water system engine, comprising an anti-freezing solution, wherein N-methyl pyrrolidone and allyl glycidyl ether are added into the anti-freezing solution and wherein the anti-freezing solution is a calcium chloride anti-freezing solution.

2. The energy-saving and environment-friendly anti-freezing solution for a water system engine according to claim 1, wherein the calcium chloride anti-freezing solution is prepared to include the following components in mass parts:
   calcium chloride 6%-8%;
   carboxymethyl cellulose 12%-14%;
   sodium benzoate 4%-7%;
   N-methylpyrrolidinone 7%-9%;
   sucrose 34%-37%;
   allyl glycidyl ether 6%-8.5%;
   pigment 0.3%-0.5%;
   urea 7-11%;
   triethanolamine 1%-5%; and
   the rest is deionized water.

3. An energy-saving and environment-friendly anti-freezing solution for a water system engine comprising an anti-freezing solution, wherein N-methyl pyrrolidone and ally glycidyl ether are added into the anti-freezing solution and wherein the anti-freezing solution is an alcohol-type anti-freezing solution.

4. The energy-saving and environment-friendly anti-freezing solution for a water system engine according to claim 3, wherein the alcohol-type anti-freezing solution is prepared to include the following components in mass parts:
   benzotriazole 13%-16%;
   2-amino-1-butanol 32%-14%;
   sodium benzoate 2%-5%;
   N-methylpyrrolidinone 7%-9%;
   sucrose 24%-27%;
   allyl glycidyl ether 6%-8.5%;
   pigment 0.3%-0.5%; and
   the rest is deionized water.

* * * * *